United States Patent [19]

Kendall, Jr.

[11] Patent Number: 5,136,881
[45] Date of Patent: Aug. 11, 1992

[54] MEASUREMENT OF WAVES IN FLOWS ACROSS A SURFACE

[75] Inventor: James M. Kendall, Jr., Pasadena, Calif.

[73] Assignee: The United States of America as represented by the Administrator of the National Aeronautics and Space Administration, Washington, D.C.

[21] Appl. No.: 568,127

[22] Filed: Aug. 16, 1990

[51] Int. Cl.$^5$ .............................. G01M 9/00
[52] U.S. Cl. .................. 73/147; 73/178 R; 73/180
[58] Field of Search ........ 73/147, 180, 178 R, 73/178 H, 178 T

[56] References Cited

U.S. PATENT DOCUMENTS

| | | | |
|---|---|---|---|
| 2,551,526 | 5/1951 | Campbell | 73/147 |
| 2,871,698 | 2/1959 | Bagby | 73/147 |
| 3,452,707 | 7/1969 | Warren | 73/180 |
| 3,620,069 | 11/1971 | Cole, Jr. | 73/587 |
| 4,188,823 | 2/1980 | Hood | 73/147 |
| 4,372,157 | 2/1983 | Caruthers et al. | 73/147 |
| 4,459,851 | 7/1984 | Crostack | 73/587 |
| 4,463,453 | 7/1984 | Cohen et al. | 73/646 |
| 4,524,620 | 6/1985 | Wright et al. | 73/587 |
| 4,738,137 | 4/1988 | Sugg et al. | 73/587 |

OTHER PUBLICATIONS

J. M. Kendall "Experimental Study of Disturbance produced in a pretransitional laminar boundary layer by weak freestream turbulence" AIAA—pp. 1–10.

W. Nitsche et al. "Investigations on flow instabilities on airfoils by means of piezofoil-arrays (wind tunnel and flight tests)"—Institut fur Luft und Taumfahrt Technische Unicersitat Berlin—pp. 1–7.

N. S. Dougherty, Jr. et al.—"Boundary—layer transition on a 10-DEG Cone: wind tunnel/flight correlation"—AIAA—pp. 1–6.

A. Demetriades—"Pressure fluctuations on hypersonic vehicles due to boundary-layer instabilities"—Montana State University, Bozeman, Mont. pp. 188–190.

J. M. Kendall "Boundary Layer Receptivity to Freestream Turbulence" AIAA—pp. 1–7—Jun. 18–20, 1990.

Primary Examiner—Donald O. Woodiel
Attorney, Agent, or Firm—Thomas H. Jones; John R. Manning; Guy M. Miller

[57] ABSTRACT

A method and apparatus for sensing wave flow across a surface wherein at least two pressure levels are sensed and combined to provide a representation of waves within the flow. In the preferred embodiment holes bored through the aircraft surface at an interval of one-half the wavelength of the flow being measured introduce pressure perturbations into a cavity so they may acoustically interfere. The interfering waveform is sensed by at least one microphone disposed in the cavity.

2 Claims, 2 Drawing Sheets

MEASUREMENT OF WAVES IN FLOWS ACROSS A SURFACE

ORIGIN OF THE INVENTION

The invention described herein was made in the performance of work under a NASA contract, and is subject to the provisions of Public Law 96-517 (35 U.S.C. Section 202) in which the Contractor has elected not to retain title.

TECHNICAL FIELD

This invention relates to the measurement of wave motion in aerodynamic flows and, more particularly, to a method and apparatus for measuring flow by sensing pressure fluctuations due to wave passage.

BACKGROUND ART

The flow of air adjacent to the surface of an aircraft wing or component, i.e., the so-called boundary-layer, can be either laminar or turbulent. The onset of turbulence brings about substantial increases in such aerodynamic parameters as drag and heat transfer. It is therefore important to study the instability waves which precede turbulence, and perhaps to try to obtain a feedback system to reduce the ill effects associated with turbulence.

Boundary-layer turbulence in general is initiated by instability waves, which are ever-present in laminar layers. Due to the effects they produce, such waves are of considerable importance for both scientific and engineering reasons.

Aircraft wing design procedures have for several years included computer programs which predict the growth of waves, and the resultant onset of turbulence. The computations are far from perfect, as is the understanding upon which they are based.

An improved method for instability wave detection and measurement is needed. Such a method could be applied to instability wave suppression for turbulence control on aerodynamic surfaces, whereupon aircraft drag would be reduced.

The most commonly employed method for wave-detection in the research laboratory is hot-wire anemometry, but this technique has several drawbacks. Hot-wire probes are invasive and easily broken. When using hot-wire probes it is necessary to survey across the boundary layer thickness to find the maximum value of the wave amplitude. Hot-wire probes and their electronic control units are quite costly. Finally, the intrusiveness of hot-wire probes itself causes turbulent waves which preclude observation at more downwind stations.

SUMMARY OF THE INVENTION

It is therefore an object of the invention to provide an apparatus and method for sensing wave-motion in aerodynamic boundary layer flows.

It is a further object of the invention to provide an inexpensive, sturdy, and noninvasive probe for the measurement of boundary layer airflow.

It is yet a further object of the invention to provide a method for the noninvasive detection of instability waves and turbulence in boundary layer airflow.

It is yet a still further object of the invention to provide a sensing apparatus and method whereby many noninvasive probes may be permanently installed, and operated simultaneously for determining the wave propagation field over a broad spatial area.

These and other objects are achieved according to the invention by providing a system for the measurement of pressure fluctuations within a flow over a surface such that the pressure levels are sensed at a minimum of two stations and combined to cancel background noise and produce a representative measurement of pressure fluctuation across the flow.

In the preferred embodiment, two small holes, or orifices, pass through an aerodynamic surface leading to respective pressure ducts. The openings are separated on the surface by a distance of one-half of a wavelength of the instability waves being measured.

In the preferred embodiment, the pressure ducts feed to a cavity wherein the signals acoustically interfere. Specifically, the ducts lead to opposite sides of a microphone diaphragm. Unwanted components which are in phase on the surface cause responses of the diaphragm which are 180 degrees out of phase. The unwanted components will subtract and cancel out, and waveflow components which are out of phase when sensed one-half of a wavelength apart will add. Thus, the interfering waveform inside the cavity becomes a representation of the waveform at the surface, and the onset of turbulence can be detected before its actual occurrence.

A microphone is disposed inside the cavity to produce an electrical signal representation of the interfering waveform inside the cavity. This electrical signal therefore represents the waveform across the surface.

DETAILED DESCRIPTION OF THE PREFERRED EMBODIMENT

The preferred embodiment of the invention is applied to airflow over a flat plate for research purposes, but the technique is equally applicable to flows over surfaces of any figure.

Figure 1:
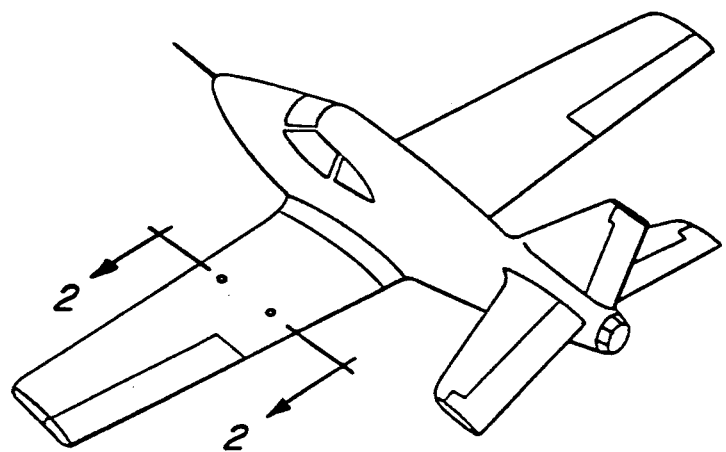
FIG. 1 is an illustration of an airplane containing the invention.

FIG. 1 illustrates how the invention may be disposed in an airplane wing to sense instability waves and turbulence and help control the ramifications of turbulence. This figure is not to scale, the separation distance of the pressure orifices is greatly exaggerated for illustrative purposes.

Figure 2:
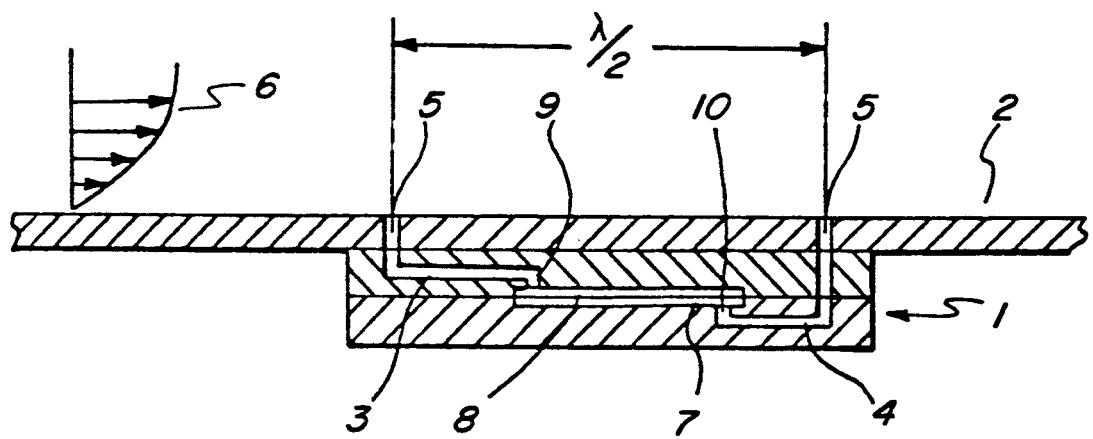
FIG. 2 is a cross-sectional illustration of the airplane of FIG. 1 showing the preferred embodiment of the invention disposed in the wing.

In the preferred embodiment, pressure fluctuations due to wave passage are measured by use of commercially-available, inexpensive electret microphones (Radio Shack Cat. No. 276-090) which have excellent sensitivity. Such an embodiment is illustrated in FIG. 2, which may be considered a cross-section of the airplane wing of FIG. 1 or a flat plate in a wind tunnel.

In these embodiments, the microphones are affixed to the reverse, i.e., nonaerodynamic, face of the test model, and communicate with the flow by means of small orifices which are open to the flow to be measured. Thus, the technique is noninvasive into the flow, generally eliminating turbulence produced by the sensor.

The straightforward use of such sensors would not be satisfactory in most situations because of the aforementioned interference from other sources. One source is the boundary layer itself, which undergoes other motions than those responsible for turbulence, and other sources arise within wind tunnels where research is conducted. Thus, it is necessary to exclude unwanted noise and pressure components from the measurements.

The exclusion of unwanted components is accomplished by measuring the difference in pressure at two points on the surface separated by a distance equal to one-half the wavelength of the waves to be measured. The pressure at the two points is therefore out of phase. The differencing, i.e., subtraction, doubles the signal due to the waves, but cancels the background signals because they have sufficiently long wavelengths to be in phase.

The separation distances, i.e., half-length of the instability waves, can either be determined theoretically or measured by use of the technique itself. The optimal separation distance will, in general, depend upon the specific location on the aircraft or test model where the measurement is to be made. The orifice spacing need not be set accurately, and a substantial error is acceptable.

The preferred embodiment is illustrated in FIG. 2. The microphone housing 1 is affixed to the reverse side of the aerodynamic surface 2. In the present implementation of the preferred embodiment, the housing dimensions are 3×1×0.4 cm in the flow direction, cross-direction, and thickness, respectively.

In the preferred embodiment, attachment of the microphone housing 1 is made by adhesive foam tape, but attachment may also be made by screws o other connectors.

Two pressure ducts, a positive pressure duct 3, and a negative pressure duct 4 feed into the microphone housing 1 from the aerodynamic surface 2. The openings 5 to these pressure ducts 3, 4 are separated by one-half of a wavelength of the boundary layer flow being measured. The boundary layer flow velocity profile is illustrated in FIG. 1 as 6. The boundary layer flows over the aerodynamic surface 2 with a change in pressure gradient.

The present invention measures the pressure signal imposed upon the aerodynamic surface 2 as the waves (represented in FIG. 1 in the boundary layer flow profile 6) pass by. The existence of pressure perturbation accompanying the instability wave motion is well-known theoretically, but it has not been used for detecting waves because it has not been considered a viable approach.

The present invention allows for such a measurement of wave motion by detecting the change in pressure perturbation across the aerodynamic surface. The sensing of pressure due to waves has been recognized by N. S. Dougherty, Jr. and D. F. Fisher, "Boundary Layer Transition on a 10° Cone: Wind Tunnel/Flight Data Correlation," AIAA Paper 80-1054, 1980, for supersonic flows, and by A. Demetriades, "Pressure Fluctuations on Hypersonic Vehicles Due to Boundary Layer Instabilities," AIAA Journal, 24 (1), p. 188, 1986, for hypersonic flows where the signals are far stronger than at subsonic speeds. However, the weak signals due to instability waves in subsonic flows are often completely obscured by background interference from other sources.

The preferred embodiment allows for these weak signals to be obtained by cancelling the noise or unwanted background. The background interference signals are those waves other than the pressure signals which are out of phase at the two sensing points or openings 5 of the pressure ducts 3, 4 of the preferred embodiment.

The two sensed pressure signals at the openings 5 are combined and interfered by leading the pressure ducts 3, 4 into a circular cavity 7. The two separate sensed pressure signals will enter the cavity 7, each imposing its own level of oscillation o the air within the cavity 7.

In the preferred embodiment, the two pressure ducts 3, 4 lead into the cavity at points 9, 10, respectively. These pressure duct/cavity introductions are placed to maximize the interference of the positive and negative pressure signals from the positive and negative pressure ducts 3, 4, respectively.

The two levels of oscillation interfere, canceling out unwanted noise signals which reach the cavity 7 out of phase, while also adding the pressure signals of the wave flow which are in phase. Thus, a representative waveform of the wave-flow is produced, and that waveform by the microphone diaphragm 8 within the cavity 7. The microphone 8 produces an electrical signal representative of the waveform produced in the cavity.

Figure 3:
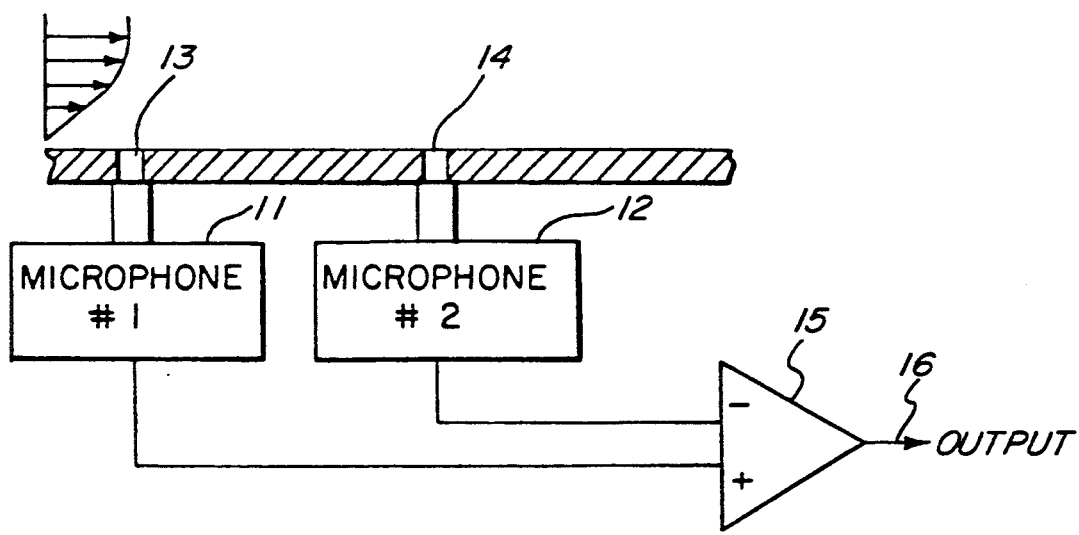
FIG. 3 is a cross-sectional illustration of a second embodiment of the invention.

In another embodiment of the invention, shown in FIG. 3, individual microphones 11, 12 sense pressure levels at respective separate orifices 13, 14. The microphones convert the sensed pressure leveles into electrical signals which are then electrically combined by differential amplifier 15 to produce representative wave form 16.

The possibility of annihilating instability waves for turbulence suppression has been contemplated many times over the past 20 years or more. What is needed for this is a means to detect the presence of such waves, and a means to generate an equal and opposite motion. The present technique, with modest modification, may have application to both aspects of this. Piezoplastic sheet materials, which are readily available (Pennwalt Corp., King of Prussia, Pa.), are well-suited to the mass fabrication of transducers which would either generate an electrical signal in response to a pressure perturbation, or generate a pressure perturbation for cancellation in response to an appropriate electrical stimulus. Obviously, a microelectronics system is needed also, but the transducer system seems quite realizable.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

I claim:

1. A method for measuring wave motion in flows across a surface, comprising the steps of:
   (a) sensing a first pressure level at a first point on the surface;
   (b) sensing a second pressure level at a second point on the surface;
   (c) combining said first and second sensed pressure levels such that interference is canceled and a representative signal of a pressure fluctuation across the flow is produced, and wherein said pressure levels are sensed at surface openings separated by one-half of a wavelength of the flow.

2. An apparatus for the measurement of wave motion in a flow across a surface, comprising:

(a) a first sensing means for detecting a first pressure level in said flow;
(b) a second sensing means for detecting a second pressure level in said flow; and
(c) a combining means for combining said first and second sensed pressure levels such that interference is canceled and a representative signal of a pressure fluctuation across the flow is produced, and wherein said first and second pressure levels are sensed at surface openings separated by one-half of a wavelength of the flow.

* * * * *